(12) United States Patent
Kerschbaumer

(10) Patent No.: US 10,235,700 B2
(45) Date of Patent: Mar. 19, 2019

(54) METHOD FOR OPERATING PAY STATIONS OF AN ID-BASED ACCESS CONTROL SYSTEM FOR A POST-PAYMENT SCENARIO

(71) Applicant: SKIDATA AG, Groedig/Salzburg (AT)

(72) Inventor: Andreas Kerschbaumer, Klagenfurt (AT)

(73) Assignee: Skidata AG, Grödig/Salzburg (AT)

( * ) Notice: Subject to any disclaimer, the term of this patent is extended or adjusted under 35 U.S.C. 154(b) by 483 days.

(21) Appl. No.: 14/966,162

(22) Filed: Dec. 11, 2015

(65) Prior Publication Data
US 2016/0171471 A1    Jun. 16, 2016

(30) Foreign Application Priority Data
Dec. 11, 2014  (EP) .................................... 14197316

(51) Int. Cl.
G06Q 30/02        (2012.01)
G06Q 20/40        (2012.01)
(Continued)

(52) U.S. Cl.
CPC ........ *G06Q 30/0284* (2013.01); *G06Q 20/202* (2013.01); *G06Q 20/40* (2013.01);
(Continued)

(58) Field of Classification Search
CPC .... G06Q 30/0284; G06Q 20/40; G06Q 30/06; G06Q 20/202; G06Q 30/04; G07F 17/0014
See application file for complete search history.

(56) References Cited

U.S. PATENT DOCUMENTS 6,411,937 B1 * 6/2002 Brusseaux ............. G06Q 20/20
340/932.2
6,823,317 B1 * 11/2004 Ouimet .................. G07B 15/02
705/13
(Continued)

FOREIGN PATENT DOCUMENTS

WO       2010027318 A1    3/2010

OTHER PUBLICATIONS

De Rogatis, A., et al. "An Automatic-Payment Parking Service Integrated within the 3G-IMS Architecture." Networking and Services, 2009. ICNS'09. Fifth International Conference on. IEEE, 2009.*
(Continued)

*Primary Examiner* — Asfand M Sheikh
(74) *Attorney, Agent, or Firm* — Davis & Bujold PLLC; Michael J. Bujold

(57) ABSTRACT

As part of the method for operating pay stations of an ID-based access control system for a post-payment scenario comprising a central server (1) and at least one access control device (5), each access control device (5) of the access control system is assigned to a zone and each pay station (4, 4', 4") is assigned to a zone. Each zone comprises a unique zone-ID and, at the start of the execution of the method for each zone a presence record created in the central server (1) is forwarded via one or more proxy-servers (2,3) to the pay stations (4, 4', 4") of each zone and stored in the pay stations (4, 4', 4"). Subsequently, at pre-set, definable time intervals or when the Delta changes recorded in the central server (1)—namely the IDs of the customer media no longer present in the zone and the IDs of customer media newly added—a pre-set threshold in a zone for the customer media newly added in this zone and/or for the customer media no longer present in the zone is exceeded, a file containing the Delta changes for updating the presence
(Continued)

record stored in the pay stations (4, 4', 4") is transmitted via one or more proxy-servers (2, 3) to the pay stations (4, 4', 4").

3 Claims, 3 Drawing Sheets

(51) Int. Cl.
    *G06Q 30/06*     (2012.01)
    *G07F 17/00*     (2006.01)
    *G06Q 20/20*     (2012.01)
    *G06Q 30/04*     (2012.01)

(52) U.S. Cl.
    CPC ............. *G06Q 30/04* (2013.01); *G06Q 30/06* (2013.01); *G07F 17/0014* (2013.01); *G06Q 2240/00* (2013.01)

(56) References Cited

U.S. PATENT DOCUMENTS

| | | | |
|---|---|---|---|
| 2002/0072964 A1* | 6/2002 | Choi | G06Q 30/04 705/13 |
| 2002/0109611 A1* | 8/2002 | Howard | G06Q 30/0284 340/932.2 |
| 2003/0076417 A1* | 4/2003 | Thomas | G07B 15/02 348/169 |
| 2004/0039632 A1* | 2/2004 | Han | G06Q 20/32 705/13 |
| 2004/0059693 A1* | 3/2004 | Hausen | G06Q 30/0284 705/418 |
| 2005/0228715 A1* | 10/2005 | Hartig | G07B 15/063 705/13 |
| 2006/0212344 A1* | 9/2006 | Marcus | G07B 15/02 705/13 |
| 2007/0168260 A1* | 7/2007 | Cunescu | G06Q 20/00 705/26.1 |
| 2007/0215697 A1* | 9/2007 | Ward | G06Q 20/10 235/380 |
| 2009/0303079 A1* | 12/2009 | Khim | G08G 1/065 340/932.2 |
| 2010/0090865 A1* | 4/2010 | Dasgupta | G08G 1/14 340/932.2 |
| 2011/0192897 A1* | 8/2011 | Hjelmvik | G06Q 20/127 235/380 |
| 2012/0130775 A1* | 5/2012 | Bogaard | G06Q 30/0284 705/13 |
| 2012/0188101 A1* | 7/2012 | Ganot | G07B 15/02 340/932.2 |
| 2012/0274482 A1* | 11/2012 | Chen | G08G 1/144 340/932.2 |
| 2013/0132167 A1* | 5/2013 | Krug | G07B 15/02 705/13 |
| 2014/0214500 A1* | 7/2014 | Hudson | G06Q 30/0284 705/13 |
| 2014/0266801 A1* | 9/2014 | Uppal | G08G 1/144 340/932.2 |
| 2015/0294431 A1* | 10/2015 | Fiorucci | G06Q 50/26 705/13 |
| 2016/0180261 A1* | 6/2016 | Rosen | G06Q 10/02 705/5 |

OTHER PUBLICATIONS

European Search Report of Corresponding EP Application No. 14197316.4.

\* cited by examiner

METHOD FOR OPERATING PAY STATIONS OF AN ID-BASED ACCESS CONTROL SYSTEM FOR A POST-PAYMENT SCENARIO

BACKGROUND OF THE INVENTION

The present invention relates to a method for operating pay stations of a customer identification ("ID") based personnel and motor vehicle access control system in a post-payment scenario.

ID-based access control systems make use of the ID of a customer medium, wherein the ID of the customer medium is read by access control devices of the access control system and forwarded to a central server which, on the basis of the ID, allows or denies access via the access control device that communicates the ID. The customer medium may be realised as an RFID tag, as an RFID card, as a paper ticket with machine-readable information or as an electronic ticket with a one or two-dimensional barcode.

ID-based access control systems, in contrast to so-called "medium-based" access control systems, where access is allowed or denied by way of information stored on a medium without contacting a central server, have the advantage of ensuring high flexibility and scaling. An ID of a customer medium may have several types of access authorisation assigned to it, such as for different areas and different times and different operators. This flexibility is of advantage, in particular, in ski resorts. This is not straightforward with medium-based access control systems, however, since the storage capacity of a customer medium is limited so that storage of information relating to a number of access authorisations is not normally possible.

ID-based access control systems, on the other hand, have the disadvantage that the central server as well as the access control devices and the pay stations must be connected with each other via a network for the purpose of data communication. When an access control device, a pay station or the central server is offline, it is nevertheless necessary to ensure that the access control system continues to operate.

With ID-based access control systems with a post-payment scenario—i.e. access control systems where the respective fees have to be paid upon leaving the area covered by the access control system—all components must be online for the proper functioning of the system. For example, in order to calculate the fee to be paid, it is necessary to know the access history of a customer medium and to be in possession of a fee and tariff tables.

One way of ensuring that the access history of a customer medium is known, given the case that a pay station is offline, consists in the use of offline data records which are stored on the customer medium and which reflect the access history of the customer medium. To this end, however, the customer media used must all be able to be written to. Disadvantageously, many types of customer media are known which, as a rule, cannot be written to, such as credit cards, non-writable RFID tags or barcodes.

SUMMARY OF THE INVENTION

A principal objective of the present invention, therefore, is to provide a method for operating pay stations of an ID-based access control systems for a post-payment scenario, whereby in performing the method, calculation of the fee to be paid is ensured without having to write data to a customer medium, even if the pay station is offline. The amount of data to be transferred over the network of the access control system shall be as small as possible.

Accordingly a method for operating pay stations of an ID-based access control system for a post-payment scenario is proposed, as part of which each pay station of the access control system is assigned to a zone of the access control system, wherein each zone has a unique zone-ID. A zone may, for example, be the entire area covered by the access control system or an individual part of the area covered by the access control system. For example, in case of a ski resort, one zone may be the ski slopes, a further zone the car park of the ski resort and a further zone the spa facility.

The access control system comprises a central server as well as at least one access control device, wherein each access control device of the access control system is assigned to a zone.

According to the invention, at the start of performing the method a presence record created for each zone in the central server is forwarded via one or more proxy server to the pay stations of each zone and stored in the pay stations, wherein subsequently, at pre-set definable time intervals, or when the Delta changes in a zone, which have been recorded in the central server, exceed a pre-set threshold for the newly added customer media and/or for no longer present customer media, a file is transmitted via one or more proxy servers to the pay stations of each zone, which contains the Delta changes, i.e. the IDs of customer media no longer present in the zone and the IDs of newly added customer media, for updating the presence record stored in the pay stations.

The presence record of each zone contains, as parameters, the zone-ID, the IDs of the customer media present in the zone, the point in time, when the customer medium was first registered in this zone and/or a service-ID (e.g. an ID assigned to the skiing or wellness service). In case only one zone is provided, the zone-ID is omitted, wherein if only one service is offered, the service-ID is also omitted. The presence of a customer medium in a zone/the point in time of when a customer medium was first registered in a zone, is ascertained based on the information supplied by the at least one access control device of the access control system in this zone.

If a pay station in a zone or the central server is offline at some point in time, i.e. when a connection for data communication cannot be established between the central server and the pay station, the offline pay station uses the presence record of this zone, which was last updated by means of the Delta changes, in order to calculate the amount due on the basis of the data contained in it and the fee and tariff information stored in the pay station. Thereupon the payment operation is performed, wherein, if the pay station, at a later point in time, is in online mode, i.e. if a connection for data communication between the central server and the pay station is established, the data of the offline transactions is communicated to the central server for the purpose of synchronisation. When the pay station is online, the fees to be paid are calculated on the basis of the data stored in the central server.

The presence record required for initialisation as well as the Delta changes of the presence record can preferably be forwarded to the pay stations via at least one active local or remote proxy server or via at least one passive local or remote proxy server.

Further re-initialisation may be performed at pre-set time intervals or upon request by the pay stations, wherein the current presence record is re-transmitted to the pay stations.

The For a full understanding of the present invention, reference should now be made to the following detailed description of the preferred embodiments of the invention as illustrated in the accompanying drawings.

BRIEF DESCRIPTION OF THE PREFERRED EMBODIMENTS

DESCRIPTION OF THE PREFERRED EMBODIMENTS

Figure 1:
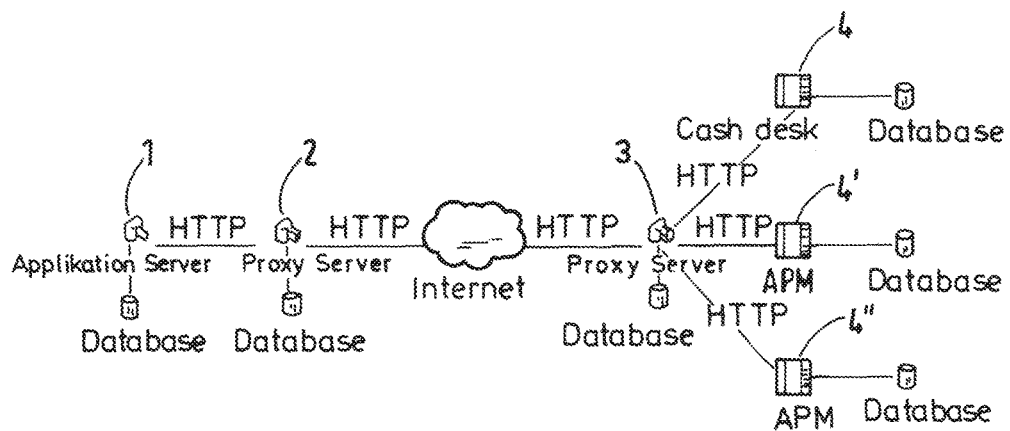
FIG. 1 is a schematic view of an access control system in order to illustrate the data flows necessary for performing the system.

The preferred embodiments of the present invention will now be described with reference to FIGS. 1-4 of the drawings. Identical elements in the various figures are designated with the same reference numerals.

According to the invention and with reference to FIG. 1 an access control system includes a central server 1, at least one access control device (not shown) and at least one pay station 4, 4', 4", wherein each pay station 4, 4', 4" of the access control system is assigned to a zone of the access control system, and wherein each zone comprises a unique zone-ID. The pay stations 4, 4', 4", in normal operation, are connected with the central server 1 for the purpose of data communication. The central server 1 as well as the pay stations 4, 4', 4" each have access to the database.

According to the invention a presence record for each zone is created in the central server, which in order to initialise the method via at least one active or passive proxy-server 2, 3, is communicated to the pay stations 4, 4', 4" of the respective zone and stored in the pay stations 4, 4', 4". Following initialisation a file containing the Delta changes, i.e. the IDs of the customer media no longer present in a zone since the last update, and the IDs of the customer media newly added to this zone in this time interval, are transmitted via one or more proxy-servers to the pay stations of each zone for updating the presence record stored in the pay stations.

With the embodiment shown in FIG. 1 communication between the pay station 4, 4', 4", the at least one proxy-server 2, 3 and the central server 1 is effected via the HTTP protocol.

The proxy-servers 2, 3 each comprise a local database, in which the presence record as well as the Delta changes communicated from the central server 1 are cached/buffered. The local databases assigned to the pay stations 4, 4', 4" are used for caching the presence record and the Delta changes as well as fee and tariff information.

The proxy-servers may be realised as active or passive local or remote proxy-servers, local meaning servers provided in the area of the pay stations.

Figure 2:
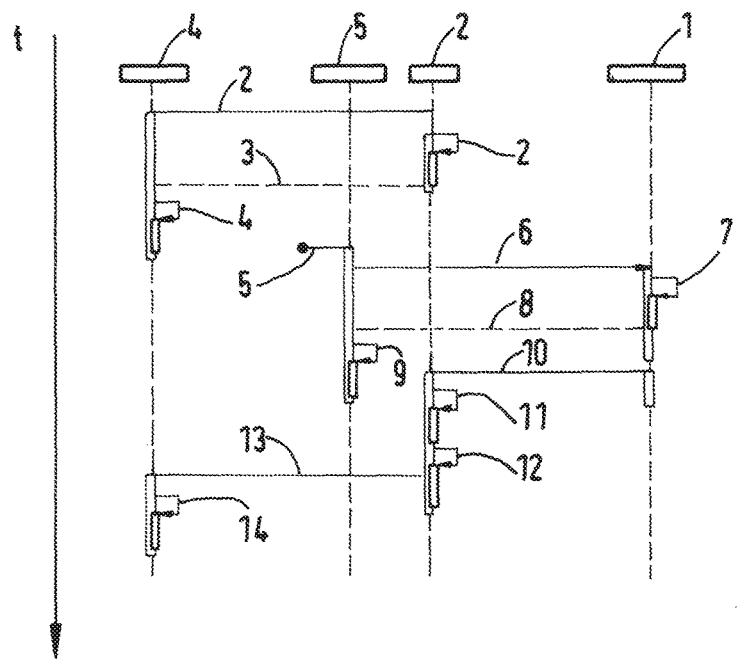
FIG. 2 is a sequence diagram in order to illustrate the use of an active local proxy server for performing the method according to the invention.

In the embodiment shown in FIG. 2 a proxy-server is used, which is realised as an active proxy-server.

An active proxy-server, in terms of the invention, is a proxy-server which without control commands generated by a pay station, establishes a connection to the central server 1 at pre-set or definable intervals, in order to request the presence record/the file containing the Delta changes, to buffer them and to communicate them to the pay stations.

With reference to FIG. 2 the method starts by registering the pay stations 4 at the active proxy server 2, which may be provided remotely or locally (step 1). Subsequently (step 2) the current presence record which has communicated to the proxy-server 2 by the central server 1, is retrieved from the buffer of the proxy-server 2 and sent to the pay station 4 (step 3), wherein the pay station 4 places the presence record into the buffer (step 4).

When at a later point in time the customer medium is registered by an access control device 5 in a zone, the ID of the customer medium is read and communicated to the central server (steps 5, 6), wherein the access control transaction data is stored in the central server 1 (step 7). Thus the access history of the customer medium in this zone is stored.

Subsequently the information "access allowed" (step 8) is communicated to the access control device 5, a barrier element of the access control device 5 is actuated in opening direction in order to allow access (step 9).

At a later point in time a file with the Delta changes of the presence record is created in the central server 1 based on the data of the access control devices and the data of the pay stations. The newly added customer media in this zone are registered by the access control devices 5, wherein the customer media which are no longer present in this zone, are recorded based on the pay station transaction data (step 10). In a next step the file with the Delta changes is communicated to the proxy-server 2, which buffers them and communicates them to the pay stations 4 (steps 11, 12, 13). This file is stored in the databases of the respective pay stations and used to update the presence record stored in the pay stations (step 14). The file with the Delta changes can be created and communicated at regular pre-set intervals. Alternatively the file containing the Delta changes can be created, when the Delta changes exceed a pre-set threshold for the newly added customer media and/or for the customer media, which are no longer present.

Figure 3:
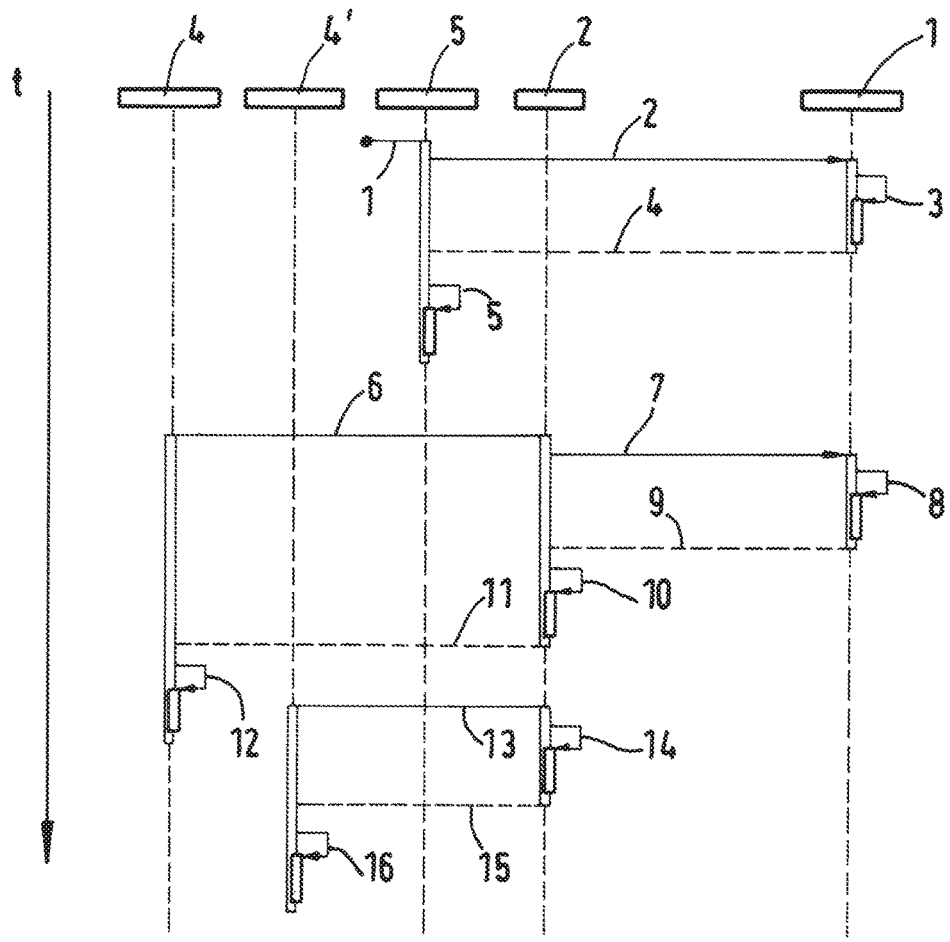
FIG. 3 is a sequence diagram in order to illustrate the use of a passive local proxy server for performing the method according to the invention.

The subject of FIG. 3 is a variant of the method according to the invention, in which a passive proxy-server is used. A passive proxy-server in terms of the invention is a proxy-server which communicates the presence record and the file containing the Delta changes to the respective pay station following a respective request by the pay stations, but which receives it only once from the central server.

With reference to FIG. 3, when a customer medium is registered, the ID of the customer medium is read by the access control device 5 of a zone and communicated to the central server 1 (steps 1, 2), wherein the access control transaction data is stored in the central server 1, thereby recording the access history of the medium (step 3). Subsequently, for a valid access authorisation, the information "allow access" is communicated to the access control device 5 and a barrier element of the access control device is actuated in opening direction (steps 4, 5).

With the embodiment shown let it be assumed that for initialisation of the method, the necessary communication of the complete presence record via the proxy-server has already taken place.

According to the invention the pay stations 4, 4' request the file containing the Delta changes from the proxy-server 2 at pre-set definable time intervals, wherein these intervals are the same for all pay stations of a zone and the files containing the Delta changes for each interval in a zone are uniquely named.

When, with reference to FIG. 3, the file containing the Delta changes for a pre-set interval is requested from a pay station 4 for the first time (step 6), the request is forwarded by the passive proxy-server 2 to the central server 1 (step 7), whereupon the central server 1 creates the file containing the Delta changes and communicates it (step 9) to the proxy-server 2.

In a next step the file containing the Delta changes is stored in the proxy-server 2 and communicated to the pay station 4 (step 11), where it is stored (step 12). When subsequently the file containing the Delta changes is requested by a further pay station 4' in the same zone for the same time interval (step 13), the file already stored in the proxy-server 2 for this interval is retrieved (step 14) and communicated (step 15) to the pay station 4', where it is stored (step 16). Advantageously the file containing the Delta changes is communicated only once for each interval by the central server to the proxy-server, wherein all pay stations 4, 4' can request this file from the passive proxy-server 2. Preferably the passive proxy-server 2 is installed locally, i.e. within the area, which is covered by the access control system.

According to the invention a number of proxy-servers may be used, and these arranged in a cascading manner.

Figure 4:
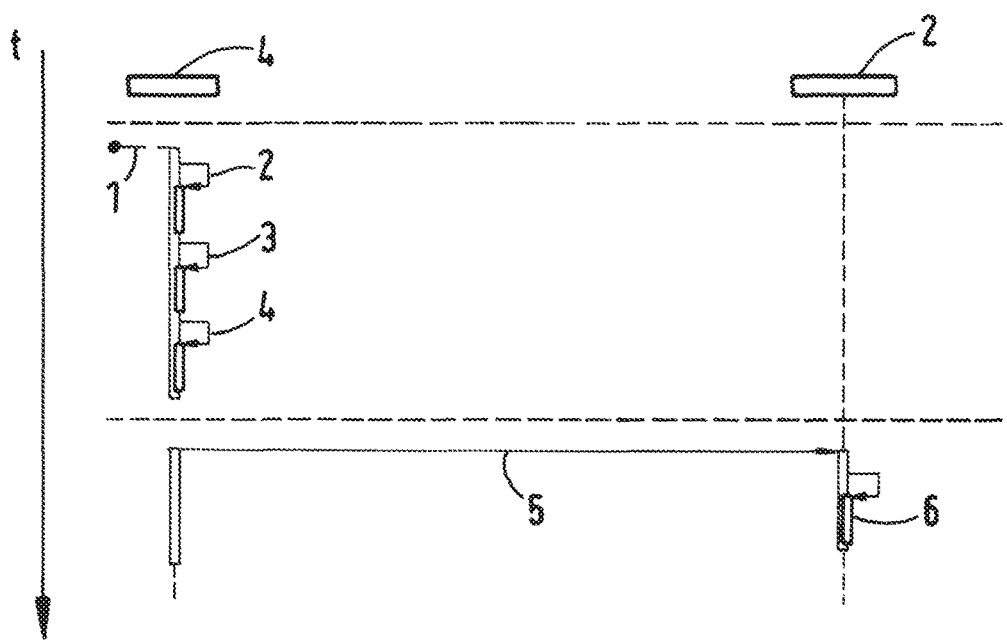
FIG. 4 is a sequence diagram in order to illustrate the steps of an offline payment according to the invention.

The subject of FIG. 4 is the carrying out of a payment operation according to the invention in case the pay station 4 is offline. After a customer medium has been registered (step 1), the presence record stored in the database of the pay station 4 and corrected to include the Delta changes, is used (step 2) for calculating the fee to be paid, wherein the fee due is calculated (step 3) based on the fee and tariff information stored in the database of the pay station 4. The payment transaction is also stored locally in the database (step 4), and at a later time when the pay station changes to an online mode, it is communicated (step 5) to, and stored (step 6) in, the central server 1.

There has thus been shown and described a novel method for operating pay stations of an ID-based access control system for a post-payment scenario which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a method for operating pay stations in a post-payment scenario of an ID-based access control system which covers a given area and comprises a central server which is connectable with a plurality of pay stations and at least one access control device for communicating therewith to facilitate calculation, by the pay stations, of an amount due when the pay stations are disconnected from the central server, the method comprising:

assigning each access control device and each pay station of the access control system to a zone having a unique zone-ID, creating a presence record in the central server and forwarding the presence record via one or more proxy-servers to the pay stations of each zone, the presence record being stored in the pay stations, recording Delta changes in the central server the Delta changes being IDs of the customer media that are no longer present in the zone and IDs of the customer media that are newly added in the zone, subsequently, transmitting a file containing the Delta changes to the pay stations of each zone via one or more of said proxy-servers for updating the presence record stored in the pay stations, the Delta changes being transmitted either at pre-set definable time intervals or when the IDs of the customer media that are no longer present in the zone and the IDs of the customer media that are newly added in the zone exceed a pre-set threshold;

wherein the presence record of each zone comprises, as parameters, (1) a zone ID, (2) IDs of the customer media present in the zone, (3) a point in time at which a customer medium was first registered in the zone and (4) a service-ID; wherein in a case where only one zone is provided, the zone-ID is omitted; wherein if only one service is offered, the service-ID is omitted;

registering the new customer media in the zone by the at least one access control device of the zone;

recording in the central server, the customer media no longer present in the zone based on transaction data of the pay stations of the zone;

when the pay station in the zone is offline such that communication between the pay station and the central server is prevented, calculating an amount due with the offline pay station using the presence record last updated by means of the Delta changes of the zone based on data contained in the presence record and fee and tariff information stored in the pay station;

subsequently performing a payment operation with the pay station, while the pay station in the zone is offline, and in which a customer pays the calculated amount due, and storing, in the pay station, transaction data of the payment operation, while the pay station in the zone is offline, communicating the performance of the payment operation from the pay station to the access control device bypassing the central server, and actuating a barrier element of the access control device in an opening direction to allow the customer to leave the zone, and when the pay station enters an online modus at a later time, communicating the transaction data of the offline payment operation from the pay station to the central server for the purpose of synchronization.

2. The method for operating pay stations of an ID-based access control system for a post-payment scenario according to claim 1, wherein the file containing the Delta changes for updating the presence record stored in the pay stations is communicated to the pay stations of each zone via a passive proxy-server, which in turn communicates the file containing the Delta changes to the respective pay stations following a respective request from the pay stations; wherein the file containing the Delta changes from the proxy-server is requested by the pay stations at pre-set, definable time intervals; wherein these intervals are the same for all pay stations of a zone; wherein the files containing the Delta changes for each interval in a zone comprise a unique name; wherein, when the file containing the Delta changes for a pre-set interval is requested for the first time by a pay station, the request is forwarded by the proxy-server to the central server, and the central server creates the file containing the Delta changes and communicates this to the proxy-server, which in turn stores the file and communicates it to the pay station and wherein, when subsequently the file containing the Delta changes for the same time interval is requested by a further pay station in the same zone, the file already stored in the proxy-server for this interval is retrieved and communicated to the pay station.

3. The method for operating pay stations of an ID-based access control system for a post-payment scenario according to claim 1, wherein the file containing the Delta changes for updating the presence record stored in the pay stations establishes, without control commands generated by a pay station, a connection via an active proxy-server to the central server at pre-set or definable intervals in order to request the file containing the Delta changes, to buffer it and to communicate it to the pay stations.

\* \* \* \* \*